(12) United States Patent
Gyure et al.

(10) Patent No.: US 10,552,301 B2
(45) Date of Patent: *Feb. 4, 2020

(54) COMPLETING FUNCTIONAL TESTING

(71) Applicant: INTERNATIONAL BUSINESS MACHINES CORPORATION, Armonk, NY (US)

(72) Inventors: Wesley J. Gyure, Wake Forest, NC (US); Adam M. Hoover, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/104,927

(22) Filed: Aug. 19, 2018

(65) Prior Publication Data

US 2018/0357146 A1 Dec. 13, 2018

Related U.S. Application Data

(63) Continuation of application No. 15/338,444, filed on Oct. 31, 2016, now Pat. No. 10,055,338, which is a (Continued)

(51) Int. Cl.
*G06F 9/44* (2018.01)
*G06F 11/36* (2006.01)
*G06F 8/70* (2018.01)

(52) U.S. Cl.
CPC .............. *G06F 11/368* (2013.01); *G06F 8/70* (2013.01); *G06F 11/3688* (2013.01)

(58) Field of Classification Search
CPC ...................................................... G06F 11/368
See application file for complete search history.

(56) References Cited

U.S. PATENT DOCUMENTS 5,214,778 A * 5/1993 Glider .................. G06F 9/5011
714/2
5,761,380 A 6/1998 Lewis et al.
(Continued)

OTHER PUBLICATIONS

Kossman, D., "The State of the Art in Distributed Query Processing," ACM Computing Surveys, Dec. 2000, vol. 32, No. 4, pp. 422-469, University of Passau.
(Continued)

*Primary Examiner* — Hang Pan
(74) *Attorney, Agent, or Firm* — Cuenot, Forsythe & Kim, LLC

(57) ABSTRACT

The Functional Tester Plug-in (FTP) extracts information from a data base to enhance automated testing tools to accommodate changes to the computer environment and so that a simulation can be fully executed even if an exception occurs. The FTP accesses the test script and static data store created by a developer using the automated testing tool, wherein the test script and static data store indicate a first resource to be tested at a verification point and a first expected result. The FTP identifies the first resource used by the test script at a first verification point and accesses the data base. The FTP identifies the status and configuration of the first resource in the data base. The FTP calculates an optimal expected result based on any changes in the status and configuration of the first resource.

15 Claims, 5 Drawing Sheets

Related U.S. Application Data continuation of application No. 14/673,014, filed on Mar. 30, 2015, now Pat. No. 9,507,697, which is a continuation of application No. 13/416,160, filed on Mar. 9, 2012, now Pat. No. 9,064,056, which is a continuation of application No. 11/744,268, filed on May 4, 2007, now Pat. No. 8,739,131.

(56) References Cited

U.S. PATENT DOCUMENTS

| | | | |
|---|---|---|---|
| 6,002,869 | A | 12/1999 | Hinckley |
| 6,076,092 | A | 6/2000 | Goldberg et al. |
| 6,122,627 | A | 9/2000 | Carey et al. |
| 6,134,540 | A | 10/2000 | Carey et al. |
| 6,226,637 | B1 | 5/2001 | Carey et al. |
| 6,493,827 | B1 | 12/2002 | Mueller et al. |
| 7,058,560 | B1 * | 6/2006 | Arakawa ............ G06F 11/3452 702/182 |
| 7,721,265 | B1 * | 5/2010 | Xu ...................... G06F 11/3664 714/31 |
| 8,185,877 | B1 | 5/2012 | Colcord |
| 8,739,131 | B2 | 5/2014 | Gyure et al. |
| 9,064,056 | B2 | 6/2015 | Gyure et al. |
| 9,507,697 | B2 | 11/2016 | Gyure et al. |
| 10,055,338 | B2 | 8/2018 | Gyure et al. |
| 2005/0149925 | A1 | 7/2005 | Pichetti et al. |
| 2007/0028217 | A1 | 2/2007 | Mishra et al. |
| 2007/0061625 | A1 | 3/2007 | Acosta et al. |
| 2007/0079289 | A1 | 4/2007 | Maccaux |
| 2008/0263084 | A1 | 10/2008 | Faihe et al. |
| 2008/0276224 | A1 | 11/2008 | Gyure et al. |
| 2012/0233598 | A1 | 9/2012 | Gyure et al. |
| 2015/0269058 | A1 | 9/2015 | Gyure et al. |
| 2017/0052871 | A1 | 2/2017 | Gyure et al. |

OTHER PUBLICATIONS

Ozsoyoglu, G., et al., "Querying Web Metadata: Native Score Management and Text Support in Databases," ACM Surveys, Dec. 2004, vol. 29, No. 4, pp. 581-634, Case Western Reserve University.

Bergholz, A., et al., "Learning Query Language of Web Interfaces," ACM Symposium on Applied Computing, Mar. 2004, pp. 1114-1121, Nicosia, Cyprus.

U.S. Appl. No. 11/744,268, Non-Final Office Action, dated Jun. 7, 2012, 8 pg.

U.S. Appl. No. 11/744,268, Final Office Action, dated Oct. 25, 2012, 11 pg.

U.S. Appl. No. 11/744,268, Non-Final Office Action, dated May 9, 2013, 10 pg.

U.S. Appl. No. 11/744,268, Final Office Action, dated Oct. 23, 2013, 13 pg.

U.S. Appl. No. 11/744,268, Notice of Allowance, dated Jan. 16, 2014, 7 pg.

U.S. Appl. No. 13/416,160, Non-Final Office Action, dated Aug. 5, 2014, 11 pg.

U.S. Appl. No. 13/416,160, Notice of Allowance, dated Jan. 21, 2015, 5 pg.

U.S. Appl. No. 14/673,014, Non-Final Office Action, dated Dec. 24, 2015, 8 pg.

U.S. Appl. No. 14/673,014, Final Office Action, dated Apr. 19, 2016, 10 pg.

U.S. Appl. No. 14/673,014, Notice of Allowance, dated Aug. 3, 2016, 5 pg.

U.S. Appl. No. 15/338,444, Non-Final Office Action, dated Jan. 5, 2018, 9 pg.

U.S. Appl. No. 15/338,444, Notice of Allowance, dated Apr. 24, 2018, 5 pg.

* cited by examiner

```
<search>
  <object>
    <identifier>Cl1</identifier>   <!-- Identifier used for linkage in later sections -->
    <objecttype>ComputerSystem</objecttype>   <!-- Object type within the data source -->
    <objectid>717700BCBBA93AEFB4B36B6BB5EE994C</objectid>   <!-- Object identifier within the data source -->
  </object>
  <object>
    <identifier>Cl2</identifier>
    <objecttype>BusinessSystem</objecttype>
    <objectid>D6904C52558332D89297A798C1BBAA94</objectid>
  </object>
  ... 1 to n objects
</search>
<failingcomponent>
  <object>
    <identifier>FC1</identifier>
    <objecttype>ComputerSystem</objecttype>
    <objectid>717700BCBBA93AEFB4B36B6BB5EE994C</objectid>
    <objectlink>Cl1</objectlink>   <!-- Link to ComputerSystem in search tag -->
  </object>
  <object>
    <identifier>FC2</identifier>
    <objecttype>TMSAgent</objecttype>
    <objectid>7427BE96C5D533079598045532782F76</objectid>
    <objectlink>Cl1</objectlink>   <!-- Link to ComputerSystem in search tag -->
  </object>
  <object>
    <identifier>FC3</identifier>
    <objecttype>WindowsOperatingSystem</objecttype>
    <objectid>C024D36E39EB35A69A655527A186806C</objectid>
    <objectlink>Cl1</objectlink>
  </object>
```

FIG. 4A continued from FIG 4A ① continued from FIG 4A ②

```
        <object>
           <identifier>FC4</identifier>
           <objecttype>IpInterface</objecttype>
           <objectid>8533A02E126B3808911952D19F3A1BE3</objectid>
           <objectlink>CI1</objectlink>
        </object>
        ... 1 to n objects linking to ComputerSystem in the search tag
        <object>
           <identifier>FC15</identifier>
           <objecttype>ComputerSystem</objecttype>
           <objectid>D6904C52558332D89297A798C1BBAA94</objectid>
           <objectlink>CI2</objectlink>   <!-- Link to BusinessSystem in search tag -->
        </object>
        ... 1 to n objects linking to BusinessSystem in the search tag
   </failingcomponent>
   <servicesimpacted>
        <object>
           <identifier>SI1</identifier>
           <objecttype>Collection</objecttype>
           <objectid>EE00C60723593DE0B4DB6C5E6860CDDB</objectid>
           <objectlink>FC1</objectlink>   <!-- Link to ComputerSystem failingcomponent tag -->
        </object>
        <object>
           <identifier>SI2</identifier>
           <objecttype>Collection</objecttype>
           <objectid>1269CA6F8003BFE98D7D0F2FF13FE88</objectid>
           <objectlink>FC1</objectlink>   <!-- Link to ComputerSystem failingcomponent tag -->
        </object>
        ... 1 to n objects linking to Failing Components objects in the failingcomponent tag
   </servicesimpacted>
```

FIG. 4B

COMPLETING FUNCTIONAL TESTING

FIELD OF THE INVENTION

The present invention relates generally to data processing and relates specifically to testing and simulating performance of software.

BACKGROUND OF THE INVENTION

When developers create a new computerized application, the new application is tested to ensure it functions properly. Automated testing tools are used to run simulations on an application. The results of the simulations indicate whether the application works properly under a variety of predefined conditions. One example of an automated testing tool is IBM's Rational Functional Tester. Although an application will be used to describe this invention, automated testing tools can also be used to test Graphical User Interface (GUI) designs and GUI flows. Developers use the results of the simulations to ensure that the application or the GUI will work properly in the future.

The first step to running a simulation is to record a static test. The developer performs a series of manipulations using the application, as if the developer was a user. The developer defines limits and parameters based on expected user inputs. The recording of the static test is called a "test script." The developer also sets verification points for the simulation by specifying expected results from a step or series of steps in the test script. The expected results are saved to a "static data store" which also contains data indicating any external applications used by the application when executing the test script. A limitation to using a static test script is that if the computer environment changes after the script is written, the simulation may not reflect the new computer environment. It would be desirable to have an automatic way of updating the static test script to reflect changes in the computer environment at the time the simulation is run.

The second step to running the simulation is executing the series of recorded manipulations from the test script. At each verification point, the functional tester compares the actual results to the expected results in the static data store. When the actual results do not match the expected results the test fails and the simulation ends. When a test fails, it is called an "exception."

If the simulation ends when an exception occurs, the developer only has enough information to correct the single problem causing the exception. The developer must resolve the issue that caused the exception and run the simulation again before subsequent verification points can be tested. It would be desirable if the automated testing tool could continue the simulation after an exception occurs and identify if the rest of the test script works properly or if there are other problems.

One type of exception that occurs when running simulations is the inability to properly access a computer resource needed by the application when running the test script. This type of exception is not caused by bad coding, but by changes in the computer environment such as the computer resource having been moved, renamed, replaced, updated, or reconfigured. Information related to the configuration of and the relationships between computer resources on the computer environment is often stored in a data base, such as a Configuration Management Data Base (CMDB). Information related to each resource stored in the CMBD is called a "Configuration Item" (CI).

A need exists for a method of using a data base, such as a CMDB, to enhance software testing simulations by ensuring the simulation can be executed to the fullest extent. The test script can be updated at run-time using the data base to accommodate changes in the computer environment. If an exception occurs at a simulation verification point, the automated testing tool can identify a related resource, as indicated in the data base, to repeat the simulation verification point and complete the simulation.

SUMMARY OF THE INVENTION

The Functional Tester Plug-in (FTP) extracts information from a data base to enhance automated testing tools to accommodate changes to the computer environment and so that a simulation can be fully executed even if an exception occurs. The FTP accesses the test script and static data store created by a developer using the automated testing tool, wherein the test script and static data store indicate a first resource to be tested at a verification point and a first expected result. The FTP identifies the first resource used by the test script at a first verification point and accesses the data base. The FTP identifies the status and configuration of the first resource in the data base. The FTP calculates an optimal expected result based on any changes in the status and configuration of the first resource. The FTP executes the test script using the optimal expected result based on any changes in the status and configuration of the first resource. Additionally, the FTP identifies a second resource related to the first resource from a record in the data base and calculates a second expected result based on executing the test script with the second resource. Responsive to an exception generated by the automated testing tool at the first verification point, the FTP repeats the test at the first verification point using the second resource. In an alternate embodiment, the FTP uses the data base to generate a set of optimal resources and a set of expected results to test at a verification point.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

FIGS. 4A and 4B are an exemplary set of meta-data definitions used by the analysis component.

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory. The term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "Functional Tester Plug-in" or "FTP."

Figure 1:
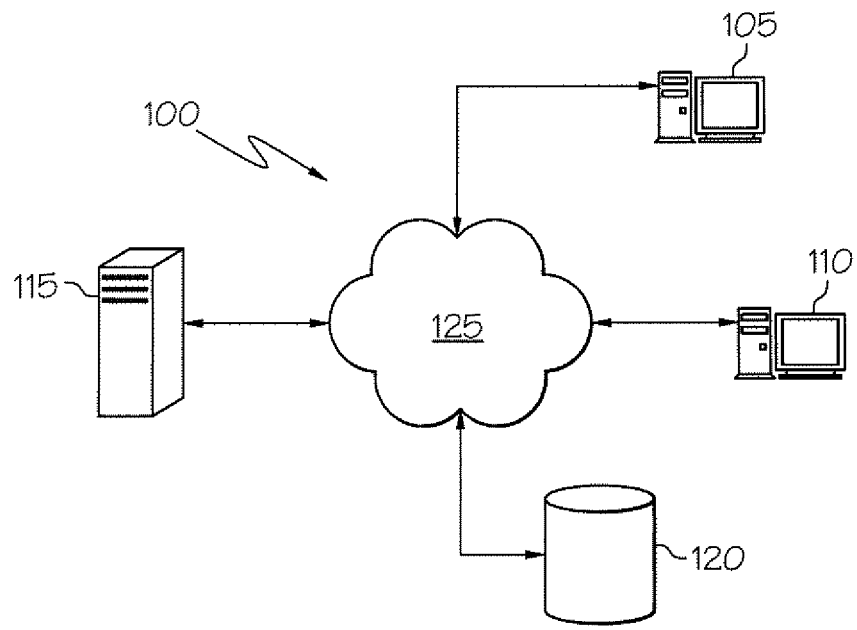
FIG. 1 is an exemplary computer network.

Additionally, the FTP is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
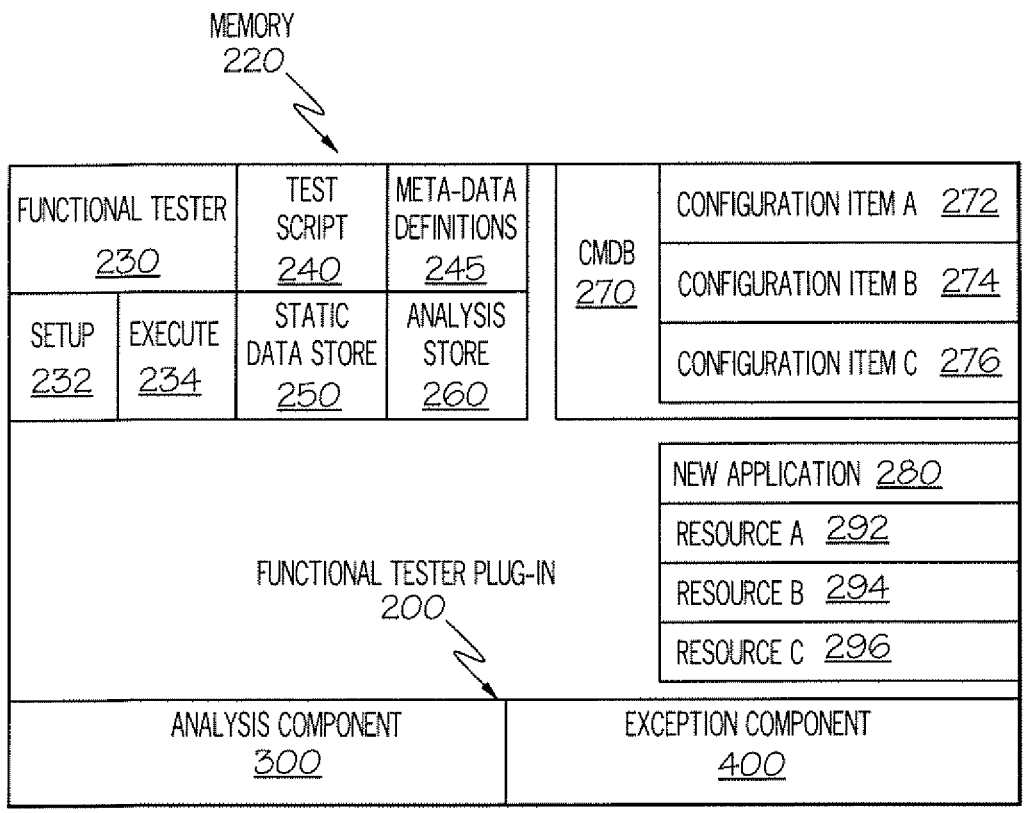
FIG. 2 describes programs and files in a memory on a computer.

FTP 200 typically is stored in a memory, represented schematically as memory 220 in FIG. 2. The term "memory," as used herein, includes without limitation any volatile or persistent medium, such as an electrical circuit, magnetic disk, or optical disk, in which a computer can store data or software for any duration. A single memory may encompass and be distributed across a plurality of media. Further FTP 200 may reside in more than one memory distributed across different computers, servers, logical partitions, or other hardware devices. The elements depicted in memory 220 may be located in or distributed across separate memories in any combination, and FTP 200 may be adapted to identify, locate and access any of the elements and coordinate actions, if any, by the distributed elements. Thus, FIG. 2 is included merely as a descriptive expedient and does not necessarily reflect any particular physical embodiment of memory 220. As depicted in FIG. 2, though, memory 220 may include additional data and programs. Of particular import to FTP 200, memory 220 may include Functional Tester 230, test script 240, meta-data definitions 245, static data store 250, analysis store 260, CMDB 270, and new application 280 with which FTP 200 interacts.

Functional Tester 230 is a prior art simulation tool, such as IBM's Rational Functional Tester, and has two prior art components related to the present invention: Setup 232 and Execute 234. Setup 232 is used by a developer to create test script 240 and meta-data definitions 245 based on new application 280. Setup 232 also allows the developer to create static data store 250 indicating verification points, other resources needed to execute test script 240, and expected results for each verification point. Execute 234 runs test script 240, comparing expected results in from static data store 250 at each verification point designated by the developer.

CMDB 270 is a prior art Configuration Management Database, shown in FIG. 2 having configuration item A 272, configuration item B 274, and configuration item C 276 corresponding to resource A 972, resource B 974, and resource C 976 respectively. CMDB 270 is a repository of all the resources on computer network 100. Configuration items A 272, B 274, and C 276 are records in CMDB 270 containing relationships between different resources, versions of the same resource, and the configuration of the resources. Resources may be any resource on network 100, such as files, hardware, firmware, software, and documentation. Although this example shows CMBD 270, FTP 200 could use any data base or other data source containing the configuration of and relationships between resources on network 100.

FTP 200 has two components: Analysis Component 300 and Exception Component 400. Analysis Component 300 creates analysis store 260 based on information in CMDB 270 whenever execute 234 of functional tester 230 runs a simulation of new application 280. Analysis store 260 describes an optimized set of resources and expected verification point results based on the run-time configuration of resources on network 100. Whenever an exception occurs at a verification point, Exception Component 400 causes execute 234 to repeat the failed verification point using a related resource from analysis store 260.

Figure 3:
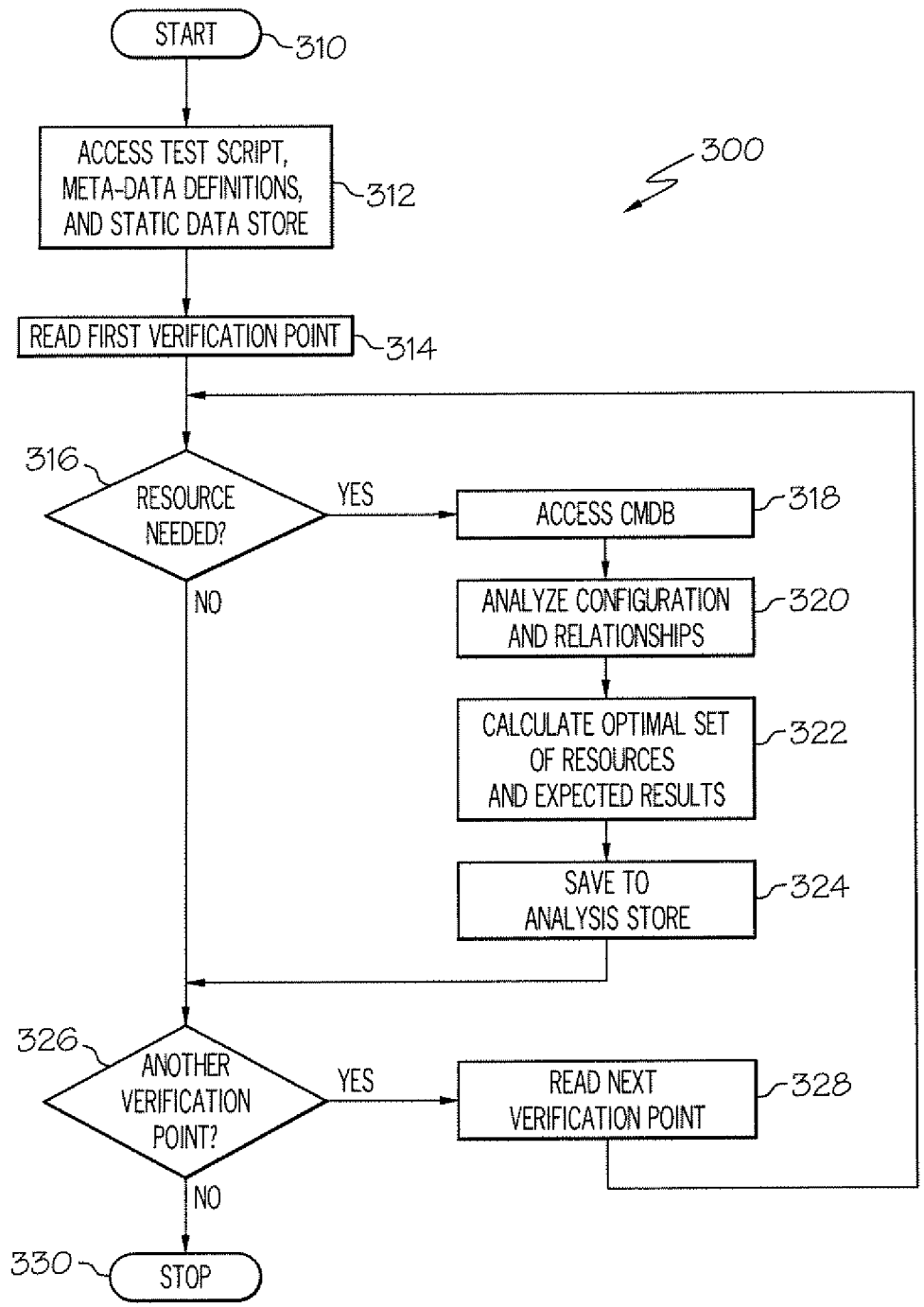
FIG. 3 is a flowchart of an analysis component.

Analysis Component 300 is shown in FIG. 3. Analysis Component 300 starts (310) whenever execute 234 of functional tester 230 runs a simulation on new application 280. Analysis Component 300 accesses test script 240, meta-data definitions 245, and static data store 250 (312) then identifies the first verification point (314). If a resource, such as resource A 292, on network 100 is needed by test script 240 at the verification point (316), Analysis Component 300 accesses CMDB 270 (318). Analysis Component 300 uses meta-data definitions 245 to analyze configuration item A 272, corresponding with resource A 292, to determine the configuration of resource A 292, identify any configuration changes of resource A 292, and identify any relationships to another resource, such as resource B 294 (320). Analysis Component 300 calculates an optimal set of resources needed by the verification point and determines expected results for any related resources (322). Analysis Component 300 saves the optimal set of resources and expected results to analysis store 260 (324). After saving to analysis store 260, or if the first verification point did not require a resource on network 100 at step 316, Analysis Component 300 determines if there is another verification point in test script 240 and data store 250 (326). If there is another verification point at step 326, Analysis Component 300 repeats steps 316-326 until all verification points have been analyzed. Once all verification points in test script 240 and data store 250 have been analyzed, Analysis Component 300 stops (330).

Meta-data definitions 245 contains a series of queries in XML format that can be used by analysis component 300 when determining an optimal set of resources needed to test a verification point. FIG. 4 shows an exemplary XML listing of definitions used when querying CMBD 270 and creating the optimal set of resources to use at a verification point at steps 318-322 above.

Figure 5:
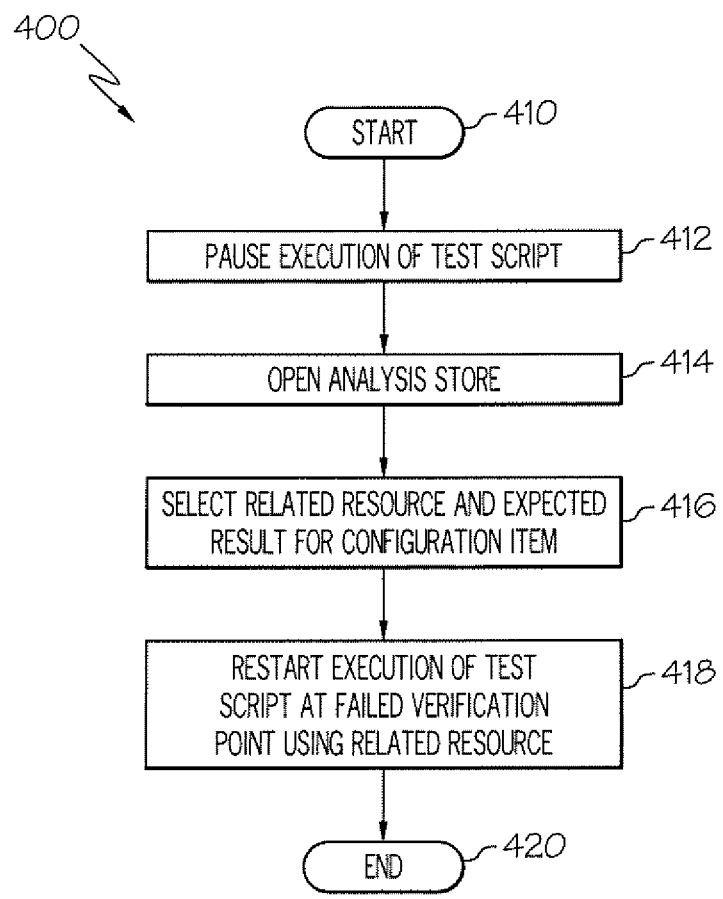
FIG. 5 is a flowchart of an exception component.

Exception Component 400 is shown in FIG. 5. Exception Component 400 starts when a failure occurs at a verification point when execute 234 of functional tester 230 runs a simulation on new application 280 (410). For example, a verification point in test script 240 requiring use of resource A 292 fails because resource A 292 is not available. Exception Component 400 pauses execute 234 (412) and opens analysis store 260 (414). Exception Component 400 selects a related resource and an expected result from using the related resource (416). For example, Exception Component 400 may select resource B 294 which is capable of performing the same task as resource A 292. Exception Component 400 restarts execute 234, repeating the test script at the failed verification point, but using the related resource, such as resource B 294 (418) then stops (420). Because Exception Component 400 responds to every failed verification point, it repeats the selection of related resources as necessary until execute 234 completes test script 240.

In an alternate embodiment, not shown in the figures, Analysis Component 300 is adapted to create multiple test scripts so that the simulation can be run multiple times for different sets of resources. For example, if new application 280 uses resource A 292 at the first verification point in test script 240. Analysis Component 300 may discover when querying CMDB 270 using meta-data definitions 245 that resource B 294 and resource C 296 are related to resource A 292. Analysis Component 300 would create a first alternate test script to repeat the simulation using resource B 294, and a second alternate test script to repeat the simulation using resource C 296. As with the primary embodiment, Analysis Component 300 will calculate expected results for the alternate test scripts and place the results in the proper data store for verification purposes. This embodiment allows the developer to more fully test new application 280 without requiring extra effort to create multiple test scripts.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A computer-implemented method for performing functional testing on an application, comprising:
   executing a test script that tests the application;
   determining that a failure occurs at a verification point in the test script because a first resource needed by the test script is not available;
   pausing, in response to the determining, the test script;
   identifying, in response to the determining and within an analysis store,
      a second resource related to the first resource, and
      an expected result for the second resource; and
   restarting execution of the test script at the verification point using the second resource.

2. The method of claim 1, wherein
the analysis store describes an optimized set of resources and expected verification point results based on the run-time configuration of resources.

3. The method of claim 1, wherein
relationships between resources are identified within a configuration management database.

4. The method of claim 1, wherein
the second resource is related to the first resource by being able to perform a same task as to the first resource.

5. The method of claim 1, wherein
the second resource is identified using meta-data definitions associated with the first resource.

6. A computer hardware system configured to perform functional testing on an application, comprising:
   a hardware processor configured to initiate the following executable operations:
      executing a test script that tests the application;
      determining that a failure occurs at a verification point in the test script because a first resource needed by the test script is not available;
      pausing, in response to the determining, the test script;
      identifying, in response to the determining and within an analysis store,
         a second resource related to the first resource, and
         an expected result for the second resource; and
      restarting execution of the test script at the verification point using the second resource.

7. The system of claim 6, wherein
the analysis store describes an optimized set of resources and expected verification point results based on the run-time configuration of resources.

8. The system of claim 6, wherein
relationships between resources are identified within a configuration management database.

9. The system of claim 6, wherein
the second resource is related to the first resource by being able to perform a same task as to the first resource.

10. The system of claim 6, wherein
the second resource is identified using meta-data definitions associated with the first resource.

11. A computer program product, comprising:
   a hardware storage device having stored therein computer usable program instructions for performing functional testing on an application,
   the computer usable program instructions, which when executed by a computer hardware system, cause the computer hardware system to perform:
      executing a test script that tests the application;
      determining that a failure occurs at a verification point in the test script because a first resource needed by the test script is not available;
      pausing, in response to the determining, the test script;
      identifying, in response to the determining and within an analysis store,
         a second resource related to the first resource, and
         an expected result for the second resource; and
      restarting execution of the test script at the verification point using the second resource.

12. The computer program product of claim 11, wherein
the analysis store describes an optimized set of resources and expected verification point results based on the run-time configuration of resources.

13. The computer program product of claim 11, wherein
relationships between resources are identified within a configuration management database.

14. The computer program product of claim 11, wherein
the second resource is related to the first resource by being able to perform a same task as to the first resource.

15. The computer program product of claim 11, wherein
the second resource is identified using meta-data definitions associated with the first resource.

* * * * *